US011451458B2

(12) United States Patent
Schneider et al.

(10) Patent No.: US 11,451,458 B2
(45) Date of Patent: Sep. 20, 2022

(54) METHOD AND SOFTWARE DEFINED NETWORK CONTROLLER FOR PERFORMING ROUND-TRIP TIME DETERMINATION BETWEEN A SOURCE ELEMENT AND A TARGET ELEMENT

(71) Applicant: NEC Laboratories Europe GmbH, Heidelberg (DE)

(72) Inventors: Fabian Schneider, Darmstadt (DE); Anton Matsiuk, Hamburg (DE); Dimitrios Gkounis, Kingston Upon Thames (GB)

(73) Assignee: NEC Corporation, Tokyo (JP)

( * ) Notice: Subject to any disclaimer, the term of this patent is extended or adjusted under 35 U.S.C. 154(b) by 636 days.

(21) Appl. No.: 16/468,300

(22) PCT Filed: Dec. 13, 2016

(86) PCT No.: PCT/EP2016/080794
§ 371 (c)(1),
(2) Date: Jun. 11, 2019

(87) PCT Pub. No.: WO2018/108246
PCT Pub. Date: Jun. 21, 2018

(65) Prior Publication Data
US 2020/0084128 A1 Mar. 12, 2020

(51) Int. Cl.
*H04L 43/0864* (2022.01)
*H04L 43/10* (2022.01)
(Continued)

(52) U.S. Cl.
CPC ...... *H04L 43/0864* (2013.01); *H04L 43/0811* (2013.01); *H04L 43/10* (2013.01); *H04L 45/38* (2013.01); *H04L 45/64* (2013.01)

(58) Field of Classification Search
CPC ..... H04L 49/25; H04L 43/0864; H04L 45/64; H04L 45/38; H04L 47/12; H04L 47/27;
(Continued)

(56) References Cited

U.S. PATENT DOCUMENTS 10,298,694 B1 * 5/2019 Tagore ................. H04L 67/145
2002/0141353 A1 * 10/2002 Ludwig ................. H04L 47/10
370/254
(Continued)

FOREIGN PATENT DOCUMENTS

WO WO-2014066359 A1 * 5/2014 ............. H04L 1/188
WO WO 2014128265 A1 8/2014
(Continued)

OTHER PUBLICATIONS

Atary et al., "Efficient Round-Trip Time monitoring in OpenFlow networks"; IEEE, Apr. 2016 (Year: 2016).*
(Continued)

*Primary Examiner* — Kamal B Divecha
*Assistant Examiner* — Sandarva Khanal
(74) *Attorney, Agent, or Firm* — Leydig, Voit & Mayer, Ltd.

(57) ABSTRACT

A method performs round-trip time determination between a source element and a target element, the source element is a forwarding element of a software defined network, which also includes a software defined network controller for controlling the forwarding elements. The method includes: instructing the source element to install a low priority detection rule, the low priority detection rule being triggerable by an incoming pong probe packet; instructing the source element to install at least one high priority detection rule having a timeout period, the high priority detection rule being triggerable by the incoming pong probe packet; instructing the source element to send a ping probe packet
(Continued)

from the source element to the target element; deriving an estimate range for the round-trip time based on the detection rule being triggered by the pong probe packet received by the source element from the target element in response to the ping probe packet.

15 Claims, 6 Drawing Sheets

(51) Int. Cl.
*H04L 43/0811* (2022.01)
*H04L 45/00* (2022.01)
*H04L 45/64* (2022.01)

(58) Field of Classification Search
CPC ......... H04L 43/10; H04L 43/16; H04L 1/188; H04L 43/08; H04L 43/0852; H04L 43/12; H04L 43/50; H04L 45/124; H04L 47/24; H04L 47/2466; H04L 43/20
See application file for complete search history.

(56) References Cited

U.S. PATENT DOCUMENTS

| | | | | |
|---|---|---|---|---|
| 2005/0287991 A1* | 12/2005 | Shima | ............ | H04L 63/0492 455/411 |
| 2006/0088024 A1* | 4/2006 | Beckstrom | .......... | H04L 47/2433 370/351 |
| 2007/0008884 A1* | 1/2007 | Tang | ............ | H04L 47/283 370/230 |
| 2008/0101253 A1* | 5/2008 | Shvodian | ............ | H04J 3/0682 370/252 |
| 2010/0135178 A1* | 6/2010 | Aggarwal | ............ | G01S 5/14 370/252 |
| 2011/0122771 A1* | 5/2011 | Joshi | ............ | H04L 43/0864 370/236 |
| 2011/0289302 A1* | 11/2011 | Ubukata | ............ | G06F 11/3466 712/227 |
| 2013/0136020 A1* | 5/2013 | Chan | ............ | H04L 43/10 370/252 |
| 2014/0233456 A1* | 8/2014 | Kodama | ............ | H04L 1/188 370/328 |
| 2016/0249316 A1* | 8/2016 | Kudekar | ............ | G01S 5/0284 |
| 2017/0019329 A1* | 1/2017 | Kozat | ............ | H04L 45/50 |
| 2017/0118119 A1* | 4/2017 | Testicioglu | ............ | H04L 67/2842 |
| 2017/0142014 A1* | 5/2017 | Vincent | ............ | H04L 43/0864 |
| 2017/0279689 A1* | 9/2017 | Mohan | ............ | H04L 45/38 |

FOREIGN PATENT DOCUMENTS

| | | | | |
|---|---|---|---|---|
| WO | WO-2015000517 A1 * | 1/2015 | ............ | G06F 13/385 |
| WO | WO 2015000517 A1 | 1/2015 | | |
| WO | WO-2016137491 A1 * | 9/2016 | ............ | H04L 41/0893 |

OTHER PUBLICATIONS

Sinha et al., 'Real-Time Monitoring of Network Latency in Software Defined Networks', IEEE 2015 (Year: 2015).*
Kempf et al., 'Scalable Fault Management for OpenFlow', IEEE 2012 (Year: 2012).*
Brandon DeLap, 'Understanding RTT Impact on TCP Retransmissions', Apr. 28, 2014, Catchpoint Systems (Year: 2014).*
Atary Alon et al: "Efficient Round-Trip Time monitoring in OpenFlow networks", IEEE INFOCOM 2016—The 35$^{th}$ Annual IEEE International Conference On Computer Communications, IEEE, Apr. 10, 2016 (Apr. 10, 2016), pp. 1-9, XP032930135.

* cited by examiner

| Match | Priority | Timeout | Action |
|---|---|---|---|
| pong | 1 | 0 | Set-Field: d_port=0; packet_in |
| pong | 2 | 4 | Set-Field: d_port=4; packet_in |
| pong | 3 | 3 | Set-Field: d_port=3; packet_in |
| pong | 4 | 2 | Set-Field: d_port=2; packet_in |
| pong | 5 | 1 | Set-Field: d_port=1; packet_in |

Fig. 5

| LB | UB | UB-LB = ΔR_EST | ΔR_EST < Acc | (LB+UB)/2 = Select TO | Pong before TO |
|---|---|---|---|---|---|
| 0ms | 32ms | 32ms-0ms = 32ms | No (32ms>2ms) | (0ms+32ms)/2 = 16ms | Yes -> UB=TO |
| 0ms | 16ms | 16ms-0ms = 16ms | No (16ms>2ms) | (0ms+16ms)/2 = 8ms | No -> LB=TO |
| 8ms | 16ms | 16ms-8ms = 8ms | No (8ms>2ms) | (8ms+16ms)/2 = 12ms | Yes -> UB=TO |
| 8ms | 12ms | 12ms-8ms = 4ms | No (4ms>2ms) | (8ms+12ms)/2 = 10ms | No -> LB=TO |
| 10ms | 12ms | 12ms-10ms = 2ms | No (2ms>=2ms) | (10ms+12ms)/2 = 11ms | No -> LB=TO |
| 11ms | 12ms | 12ms-11ms = 1ms | Yes (1ms<2ms) | done | |

Fig. 6

METHOD AND SOFTWARE DEFINED NETWORK CONTROLLER FOR PERFORMING ROUND-TRIP TIME DETERMINATION BETWEEN A SOURCE ELEMENT AND A TARGET ELEMENT

CROSS-REFERENCE TO PRIOR APPLICATIONS

This application is a U.S. National Stage Application under 35 U.S.C. § 371 of International Application No. PCT/EP2016/080794 filed on Dec. 13, 2016. The International Application was published in English on Jun. 21, 2018, as WO 2018/108246 A1 under PCT Article 21(2).

FIELD

The present invention relates to a method for performing round-trip time determination between a source element and a target element.

Furthermore, the present invention relates to a software defined network controller for round-trip time determination between a source element and a target element.

BACKGROUND

In recent years network monitoring is a crucial task for Internet service providers (ISPs) to ensure their network is working as expected and that the service level agreements (SLAs) with their customers are fulfilled.

In methods and systems for network monitoring, network monitoring can be deployed by using dedicated monitoring probes that generate and receive test traffic. The term test traffic may also be designated as probe traffic, wherein probe packets are generated and transmitted in the network for testing and determining network parameters. FIG. 1 illustrates an application scenario of a typical network monitoring probe deployment. The goal is to perform full end-to-end path monitoring to ensure that the whole network is working as intended. The monitoring probes are located close to the customer edge inside the points of presence of the ISPs. The monitoring probes are attached to the network like regular customers would be connected, i.e. by using the access technologies such as DSL, Cable, PON, FttH, etc. that are present at the point of presence (PoP).

While the network is managed by the network management system (NMS) the monitoring probes are orchestrated by a monitoring manager, which may receive some information from the Operations Support System and Business Support System (OSS/BSS system). Typically such information may include guarantees given to the customers according to the service level agreements (SLAs). Furthermore, this information may include information about the topology of the network, especially with respect to the location of the monitoring probes.

In the field of network monitoring, there are diverse network probing mechanisms such as round-trip time (RTT) measurement, wherein a mechanism similar to the ping tool is usually utilized. A monitoring probe A sends a packet to a monitoring probe B, which sends back a reply to the monitoring probe A, and then the monitoring probe A can calculate the RTT by subtracting the time-stamp of the reply from the time-stamp of the initial probe packet.

Conventional methods and systems for network monitoring have the problem that relevant probing techniques require careful crafting of the probe traffic. However, this is not possible in network elements, neither in legacy networks nor in typical software defined networks (SDNs) such as networks controlled by OpenFlow. With regard to OpenFlow it is exemplarily referred to non-patent literature of Open Networking Foundation: "OpenFlow Switch Specification", Version 1.3.4 (Mar. 27, 2014-TS-019) retrievable at www.opennetworking.org/images/stories/downloads/sdn-resources/onf-specifications/openflow/openflow-switch-v1.3.4.pdf.

Hence, known network monitoring systems are implemented with dedicated monitoring probe devices and a probing orchestrator, which is cumbersome and inflexible.

Software-defined networking may provide various new capabilities that have not been available in legacy networks. A use case might be to use SDN controlled network elements to perform network measurement instead of dedicated network measurement/monitoring probe devices that are used in legacy networks. However, by doing this, time-stamping capabilities may be needed in SDN switches as The control channel delay between a SDN controller and a switch cannot be determined with high accuracy and depends on the current load on the control channel.

The SDN controller performs the time-stamping in software, this means that depending on when the processing of the time-stamping is scheduled relatively to a Packet_out message and a Packet_in message the time stamp may be inaccurate.

Various implementations of OpenFlow agents and their hidden processing logic do not allow to estimate and to correlate processing delays of one type of messages based on the measurements for the others. Moreover, these delays and their cross-correlations may change significantly under dynamically changing load of a switch. Furthermore, such approaches typically do not consider time-stamping inaccuracy introduced by the SDN controller's processing logic.

However, in this regard it is disadvantageous that time-stamping capabilities could not be widely available in forwarding elements such as SDN switches.

SUMMARY

An embodiment of the present invention provides a method that performs round-trip time determination between a source element and a target element, the source element being a forwarding element of a software defined network, the software defined network including forwarding elements, and a software defined network controller for controlling the one or more forwarding elements, the method includes the steps of: instructing the source element to install a low priority detection rule, the low priority detection rule being triggerable by an incoming pong probe packet; instructing, the source element to install at least one high priority detection rule having a timeout period, the high priority detection rule being triggerable by the incoming pong probe packet; instructing the source element to send a ping probe packet from the source element to the target element; and deriving an estimate range for the round-trip time based on the detection rule being triggered by the pong probe packet that is received by the source element from the target element in response to the ping probe packet.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 5 is a table illustrating flow rules for a method according to an embodiment of the present invention; and FIG. 6 is a table illustrating a numerical example for a method according to an embodiment of the present invention.

DETAILED DESCRIPTION

Figure 1:
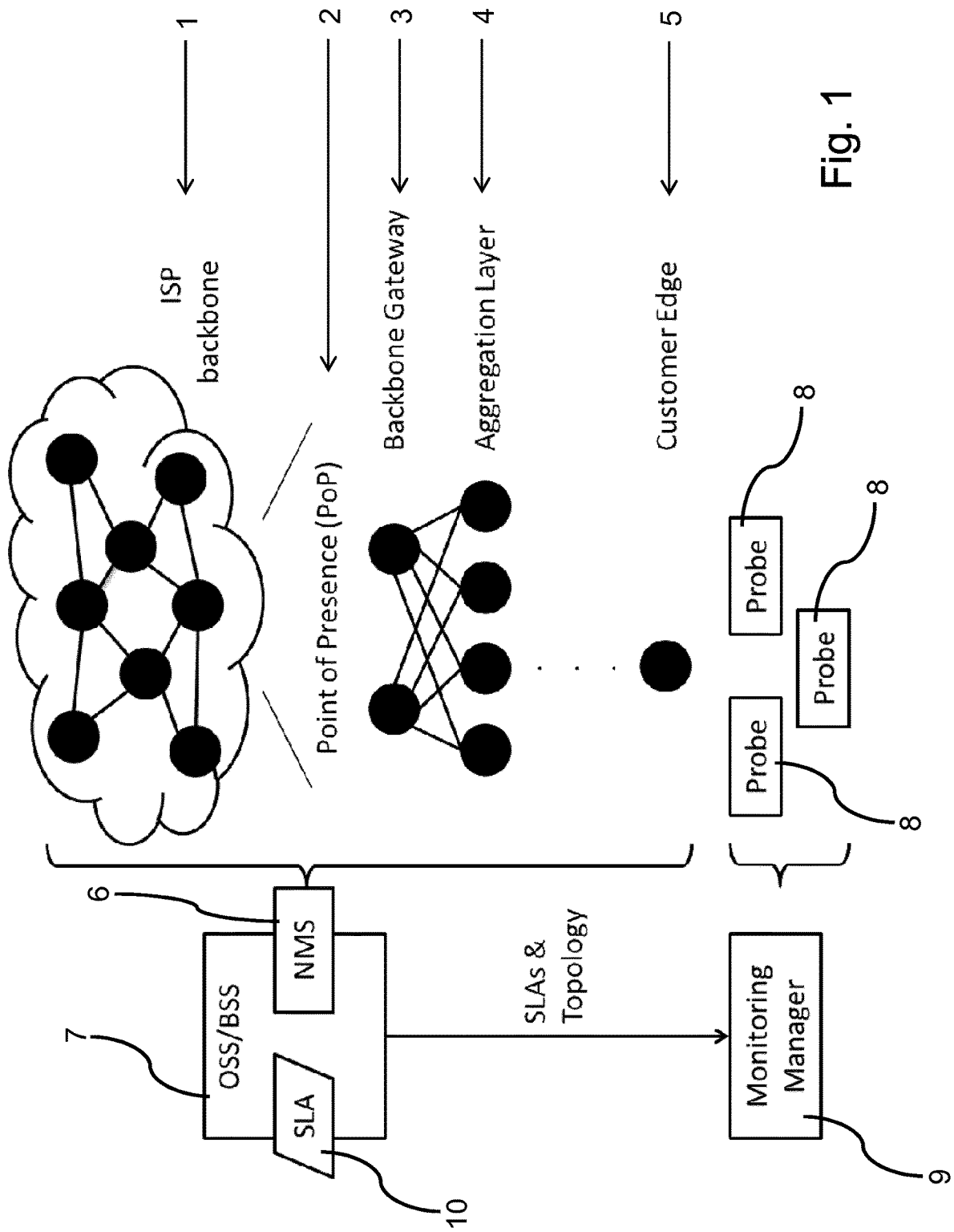
FIG. 1 is a schematic view illustrating an application scenario of a typical network monitoring probe deployment.

Embodiments of the present invention improve and further develop a method of the initially described type for performing round-trip time determination between a source element and a target element in such a way that an alternative mechanism for round-trip determination, in particular without the requirement of time-stamping capability in a forwarding element, is provided.

According to an embodiment, there is provided a method for performing round-trip time determination between a source element and a target element, wherein the source element is a forwarding element of a software defined network, wherein the software defined network includes one or more forwarding elements and a software defined network controller for controlling the one or more forwarding elements, the method including the steps of:

a) instructing, in particular by the software defined network controller, the source element to install a low priority detection rule, wherein the low priority detection rule is triggerable by an incoming pong probe packet;

b) instructing, in particular by the software defined network controller, the source element to install at least one high priority detection rule having a timeout period, wherein the high priority detection rule is triggerable by an incoming pong probe packet;

c) instructing, in particular by the software defined network controller, the source element to send a ping probe packet from the source element to the target element;

d) deriving, in particular by the software defined network controller, an estimate range for the round-trip time based on the detection rule being triggered by the pong probe packet that is received by the source element from the target element in response to the ping probe packet.

Furthermore, embodiments of the present invention provide a software defined network controller for round-trip time determination between a source element and a target element, wherein the source element is a forwarding element of a software defined network, preferably wherein the software defined network controller is configured to instruct the target element to install a pong probe packet generation rule, wherein the pong probe packet generation rule is triggerable by an incoming ping probe packet, wherein the software defined network controller is further configured to instruct the source element to install a low priority detection rule, wherein the low priority detection rule is triggerable by an incoming pong probe packet, wherein the software defined network controller is further configured to instruct the source element to install at least one high priority detection rule having a timeout period, wherein the high priority detection rule is triggerable by an incoming pong probe packet, wherein the software defined network controller is further configured to instruct the source element to send a ping probe packet from the source element to the target element, and wherein the software defined network controller is further configured to derive an estimate range for the round-trip time based on the detection rule being triggered by the pong probe packet that is received by the source element from the target element in response to the ping probe packet.

According to aspects of the present invention it has first been recognized that round-trip time (RTT) determination in the context of software defined networking can be performed by employing flow rules in combination with timeout functionality. A flow rule timeout, i.e. for example a flow table entry timeout, may be implemented such that an internal timer is started and the flow rule/entry is removed after the specified timeout period. According to the invention, the source element is instructed to install a low priority detection rule, wherein the low priority detection rule is triggered by an incoming pong probe packet. For example, the software defined network controller can instruct the source element accordingly. In order to perform the measuring process the source element is instructed to install at least one high priority detection rule having a timeout period, wherein the high priority detection rule is also triggerable by an incoming pong probe packet. Moreover, preferably by the software defined network controller, the source element is instructed to send a ping probe packet from the source element to the target element. Then, an estimate range for the round-trip time is derived based on the detection rule being triggered by the pong probe packet that is received by the source element from the target element in response to the ping probe packet. The detection rule being triggered may be the low priority detection rule or the at least one high priority detection rule. Thus, by the use of timeouts for flow rules together with the possibility to generate an immediate response on the target element in the context of RTT determination allows substituting the need for time-stamping of data packets in forwarding elements and/or the need for dealing with inaccuracy of control-channel RTT estimation.

Hence, a method and a software defined network controller according to the present invention provide an alternative mechanism for round-trip determination, in particular wherein time-stamping capabilities in the source element and/or in the target element is not required for the determination of round-trip times.

The term "probe packet" may refer in particular in the claims, preferably in the description, to a packet used in an active measurement experiment/task to collect knowledge on a given network parameter of interest, in particular such as a round-trip time between a source element and a target element.

The term "ping probe packet" may refer in particular in the claims, preferably in the description, to an initial probe packet that is sent from the source element that may preferably function as source monitoring probe to the target element that may preferably function as target monitoring probe.

The term "pong probe packet" may refer in particular in the claims, preferably in the description, to a reply probe packet that is sent out from the target element that may preferably function as target monitoring probe. In the context of a round-trip time measurement as measuring task the pong probe packet is sent as reply from the target element to the source element that may preferably function as source monitoring probe.

According to embodiments of the invention the method may additionally include the step of instructing the target element to install a pong probe packet generation rule, wherein the pong probe packet generation rule is triggerable by an incoming ping probe packet. For example, the target element may be instructed by the software defined network controller accordingly. Furthermore, the step of instructing the target element to install the pong probe packet generation rule may be performed prior to sending out the ping probe packet according to step c). Thus, the target element is able to respond to an incoming ping probe packet, wherein the pong probe packet can be generated by the pong probe packet generation rule. Then, the pong probe packet will be received by the source element from the target element. In this regard, the target element may be a forwarding element of the software defined network. Hence, according to an embodiment of the present invention, the method may include the steps of:
- instructing, in particular by the software defined network controller, the target element to install a pong probe packet generation rule, wherein the pong probe packet generation rule is triggerable by an incoming ping probe packet.
- instructing, in particular by the software defined network controller, the source element to install a low priority detection rule, wherein the low priority detection rule is triggerable by an incoming pong probe packet;
- instructing, in particular by the software defined network controller, the source element to install at least one high priority detection rule having a timeout period, wherein the high priority detection rule is triggerable by an incoming pong probe packet;
- instructing, in particular by the software defined network controller, the source element to send a ping probe packet from the source element to the target element;
- deriving, in particular by the software defined network controller, an estimate range for the round-trip time based on the detection rule being triggered by the pong probe packet that is received by the source element from the target element in response to the ping probe packet.

Furthermore, it may be conceivable that the target element is a network element of another network. For instance, the target element may be any network device that is able to respond to the ping probe packet with a pong probe packet, e.g. an endpoint device such as a desktop computer, laptop, smartphone, tablet, thin client, printer, etc.

According to embodiments of the invention the software defined network controller may configure network elements such as the source element and/or the target element, to generate one or more probe packets by creating probe packet template information that is provided to the network elements, wherein the probe packet template information includes one or more probe packet templates and/or probe packet template handling instructions. Thus, the software defined network controller can configure the network elements, i.e. the source element and/or the target element for probe packet generation. For example, the concept of Packet Template (PT) as exemplarily specified in the document WO 2015/000517 A1 can be used in an advantageous way for probe packet generation on network elements. Document WO 2015/000517 A1 describes a mechanism for generating packets directly on forwarding network elements such as switches of a software defined network. This mechanism for programming in-switch generation may be used according to an embodiment of the present invention in order to improve, enrich and simplify round-trip time determination, namely by generating probe packets using the Packet Template (PT) mechanism. Advantageously, the most network elements from the customer edge all the way up to the backbone gateway are SDN-enabled and in-switch packet generation enabled. Hence, by using one or more probe packet templates the load on the control channel between the forwarding elements and the software defined network controller is significantly reduced.

Furthermore, with regard to in-switch packet generation, e.g. by using Packet Templates, it is exemplarily referred to the non-patent literature of
- Roberto Bifulco, Julien Boite, Mathieu Bouet and Fabian Schneider: "Improving SDN with InSPired Switches", 2016, In Proceedings of the Symposium on SDN Research (SOSR '16), ACM, New York, N.Y., USA retrievable at "http://conferences.sigcomm.org/sosr/2016/papers/sosr_paper 42.pdf"

and to the non-patent literature of
- F. Schneider, R. Bifulco and A. Matsiuk: "Better ARP handling with InSPired SDN switches", In 2016 IEEE International Symposium on Local and Metropolitan Area Networks (LANMAN), Rome, Italy, pp. 1-6.

Probe packet template information provided to a forwarding element such as a switch may include triggering instructions, a probe packet template and probe packet handling instructions. Thus, the triggering instructions may represent a trigger for the probe packet generation. The probe packet template may be represented by a byte array, including the packet headers and content, for generating the probe packet on the forwarding network element. The probe packet handling instructions represent instructions what to do with the byte array before sending it out as probe packet.

According to embodiments of the invention, the pong probe packet generation rule may be configured to generate a pong probe packet that is sent back to the source element. Thus, the target element, e.g. a forwarding element of the software defined network, may be prepared by the software defined network controller in such way that an immediate response on the target element can be generated.

According to embodiments of the invention, the low priority detection rule according to step a) may be permanently enabled on the source element. Thus, a default rule is provided in order to process incoming probe packets.

According to embodiments of the invention, the low priority detection rule may be configured to drop the incoming pong probe packet. Hence, an incoming pong probe packet is discarded and thus not forwarded to the software defined network controller whereof the software defined network controller can conclude that the target element has received the pong probe packet after the timeout period of the high priority detection rule or even not received at all.

According to embodiments of the invention, the low priority detection rule may be configured to mark the incoming pong probe packet as late, and to forward the marked pong probe packet. Thus, the software defined network controller will know if the pong probe packet has been received after the timeout period of the high priority detection rule.

According to embodiments of the invention, the high priority detection rule may be configured to forward the incoming pong probe packet to the software defined network controller. Thus, the software defined network controller will know if the pong probe packet has been received within the timeout period of the high priority detection rule. Hence, the software defined network controller can conclude if a pong probe packet has been received early or late with regard to the adjusted timeout period of the high priority detection rule.

According to embodiments of the invention, the high priority detection rule may be further configured to mark the incoming pong probe packet as early. Thus, the software defined network controller will know whether the pong probe packet has been received within the timeout period of the high priority detection rule. In this case, the low priority detection rule might forward the received pong probe packet—preferably unmodified—to the software defined network controller.

According to embodiments of the invention, it may be provided that activating the high priority detection rule according to step b) and sending the ping probe packet according to step c) are synchronized. Thus, the precision and accuracy of the round-trip time determination/estimation can be increased.

According to embodiments of the invention, one or more measurement iterations may be performed, wherein a measurement iteration may include steps b), c) and d) such that the measurement iterations includes instructing the source element to install at least one high priority detection rule having a timeout period, instructing the source element to send a ping probe packet from the source element to the target element, and deriving an estimate range for the round-trip time based on the detection rule being triggered by the pong probe packet that is received by the source element from the target element in response to the ping probe packet.

According to embodiments of the invention, it may be provided that—prior to starting a measurement iteration that preferably includes steps b), c) and d)—the estimate range for the round-trip time is initially defined, wherein a lower bound and an upper bound of the estimate range is set up. For example, on controller side two variables may be set up for these bounds, which represent the current best estimate range. Initially, it is started with suitable values:

For example, these bounds may be defined by setting the lower bound to zero and the upper bound to a worst case estimate of an upper bound depending on the network in which the measurements are performed. Examples for such upper bounds would for example be 1000 ms for world-wide networks, 200 ms for nation-wide networks in Europe, or 20 ms for data-center networks.

Another option to determine the bounds may be to run a series of tests (again using the timeout test approach) with exponentially increasing timeout values. One can stop the testing if the tests show an above the RTT result. In this case one would use the highest timeout value that is still below the RTT as lower bound and the smallest timeout value above the RTT as upper bound.

According to embodiments of the invention, it may be provided that a measurement iteration, which may include steps b), c) and d), is iteratively repeated. Advantageously, the timeout period of the high priority detection rule according to step b), which is installed on the source element per measurement iteration, may be set to a new timeout period value based on the estimate range derived in the preceding measurement iteration. In doing so, step d) of the current measurement iteration may update the estimate range for the round-trip time.

Hence, embodiments of the present invention can be used to estimate a round-trip time (RTT) between two network elements, i.e. between a source element and a target element. For example, these two network elements may be SDN forwarding elements. At a high-level, the timeout functionality is leveraged to determine whether the RTT is below or above the hard timeout value of a flow rule in the SDN forwarding element functioning as source element. Before the measurements start, an estimation of the RTT is initially made which defines coarse lower and upper bounds for the RTT as exemplarily described above. During the measurements, i.e. during the measurement iterations, a flow rule with different hard timeouts is installed each time in the originating switch and simultaneously a ping is generated from the same switch. The interaction of the installed rule with a ping reply, i.e. pong probe packet, helps estimating the RTT by narrowing the lower and upper bounds of the initial estimation/estimate range of the RTT. The bounds are modified according to whether the ping reply arrives at the originating source element before or after the previous relevant flow entry is removed. The hard flow timeout is modified in the next measurement iteration and the same concept is triggered again until a predetermined and/or satisfactory estimation or rather estimate range is achieved.

According to embodiments of the invention the new timeout period value of a current measurement iteration may be computed by $$\frac{(upper + lower)}{2},$$

wherein upper is the upper bound of the estimate range derived in the preceding measurement iteration, and wherein lower is the lower bound of the estimate range derived in the preceding measurement iteration. Thus, a new timeout period can be computed in a fast and efficient way.

According to embodiments of the invention, the estimate range may be updated by modifying a lower bound and/or an upper bound of the estimated range depending on whether the pong probe packet, which is responsive to the ping probe packet previously sent out, is received by the source element within the timeout period of the high priority detection rule. Thus, the estimate range can be adapted in a suitable way such that the accuracy of the estimate range will be increased.

According to embodiments of the invention, a measurement iteration—in particular including steps b), c) and d)—may be repeated until a predetermined accuracy of the estimate range for the round-trip time is achieved.

According to embodiments of the invention, the software defined network controller may perform measurement tasks in parallel, wherein the measurement tasks include steps a), b) and c), and wherein the timeout period of the high priority detection rules according to step b) of the measurement tasks are set to different timeout period values. The measurement tasks may additionally include the step according to which the target element is instructed to install a pong probe packet generation rule, wherein the pong probe packet generation rule is triggerable by an incoming ping probe packet. This step may be performed preferably prior to sending out the ping probe packet according to step c). Hence, in order to increase the speed of the measuring process such that it converges to a good estimation of the RTT, the method according to an embodiment of the invention can be extended by running multiple parallel tests. Thus, the round-trip time can be faster estimated and this parallel process requires a small number of flow entries compared to the total number of flow entries in current SDN switches.

According to embodiments of the invention, it may be provided that multiple high priority detection rules are installed in the source element by step b), wherein the multiple high priority detection rules are assigned with different priorities, wherein the timeout period of the multiple high priority detection rules are set to different timeout period values, and wherein the multiple high priority detection rules are configured to embed information about their timeout period value into the incoming pong probe packet and to forward the pong probe packet to the software defined network controller. Thus, the determination/estimation of the round-trip time is more advanced and accelerated.

An embodiment of the present invention may also be used for measuring the round-trip time of flows belonging to different queues at network elements. The software defined network controller needs only to hold information about the dedicated queues at the network elements in order to appropriately craft the flow rules—such as pong probe packet generation rule, low priority detection rule, high priority detection rule and/or rule for sending out a ping probe packet—to use for this measurement.

Embodiments of the present invention may be used for single-hop round-trip time measurements and for multi-hop round-trip time measurements. Thus, round-trip time estimation/determination between two end network elements that are connected with arbitrary number of network elements in between can be performed. For example, this may be realized by modifying the rules to use in a way which accommodates the end-to-end path by leveraging the single-hop concept. This is feasible since the software-defined network controller is a centralized entity that holds information about the complete network topology.

At least one embodiment of the present invention provides a solution that does not require time-stamping for the estimation of round-trip times, while still avoiding the inaccuracies such as:
  The control channel delay between a SDN controller and a switch cannot be determined with high accuracy and depends on the current load on the control channel.
  The SDN controller performs the time-stamping in software, this means that depending on when the processing of the time-stamping is scheduled relatively to a Packet_out message and a Packet_in message the time stamp may be inaccurate.
  Various implementations of OpenFlow agents and their hidden processing logic do not allow to estimate and to correlate processing delays of one type of messages based on the measurements for the others. Moreover, these delays and their cross-correlations may change significantly under dynamically changing load of a switch. Furthermore, such approaches typically do not consider time-stamping inaccuracy introduced by the SDN controller's processing logic.

At least one embodiment of the present invention enables RTT estimation without the need for in-switch time-stamping while not requiring the controller to perform RTT estimation and time-stamping and while avoiding the need for control channel RTT estimation when doing in-network RTT measurements.

FIG. 1 shows an application scenario of a typical network monitoring probe deployment. FIG. 1 shows an Internet backbone 1 of an Internet service provider (ISP). The Internet backbone 1 is accessible by a Point of Presence (PoP) 2, wherein network connection may be provided from one or more backbone gateways 3 via an aggregation layer 4 through to the customer edge 5. The network is managed by a network management system (NMS) 6 that is located within a system/business support system (OSS/BSS) 7. The OSS/BSS 7, operated together by the ISP, are used to support a range of telecommunication services. According to FIG. 1, monitoring probes 8 are placed at the customer edge 5 of the network. The monitoring probes 8 are orchestrated by a monitoring manager 9 that may receive information from the OSS/BSS 7. This information may include the guarantees given to the customers according to service level agreements (SLAs) 10. Furthermore, this information may include information about the topology of the network, in particular with respect to the location of the monitoring probes.

Figure 2:
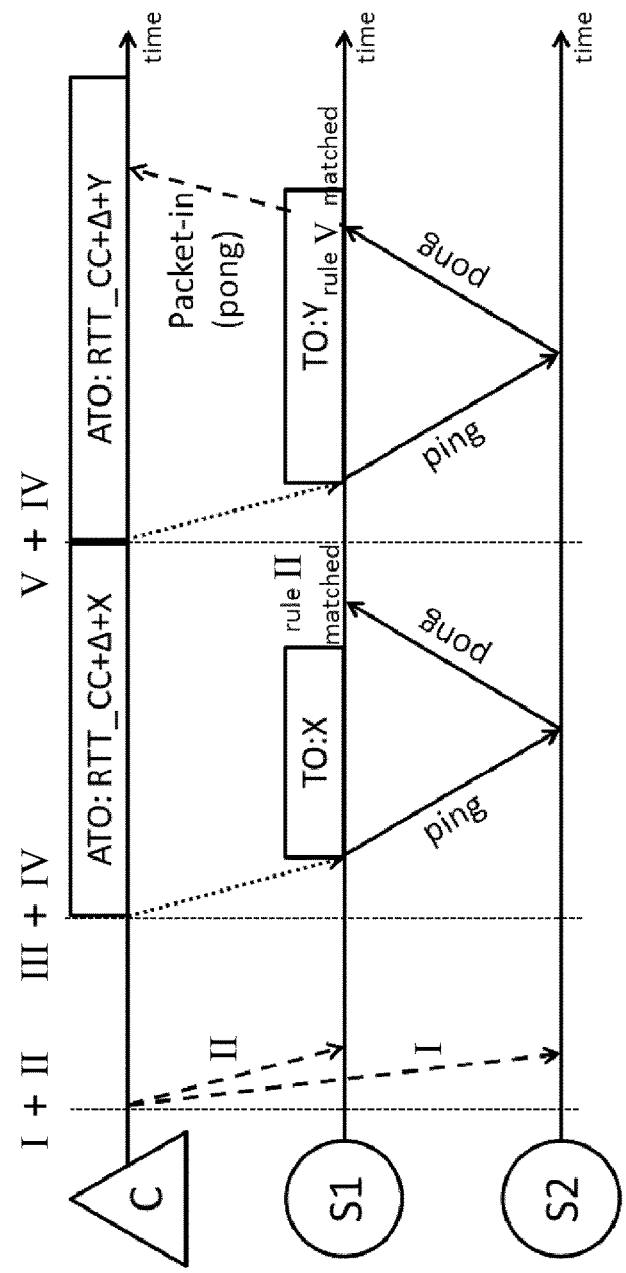
FIG. 2 is a sequence diagram illustrating a method according to an embodiment of the present invention.

FIG. 2 shows in the lower part a sequence diagram illustrating a method according to an embodiment of the present invention. The example of FIG. 2 assumes a simple network of two switches S1 and S2, which are connected to each other. The switches S1 and S2 are controlled by a software defined network (SDN) controller C.

According to the embodiment of FIG. 2 the round-trip time (RTT) between switch S1 as source element and switch S2 as target element is estimated by using only flow entry timeouts and in-switch packet generation as follows:
1. Preconfiguration:
  Install a pong probe packet generation rule I in switch S2, which is triggered when a predefined ping probe packet (designated as "ping" in the figures) arrives from switch S1. Switch S2 as target element will generate a pong probe packet (designated as "pong" in the figures) that is sent back to switch S1. The pong probe packet generation rule can be programmed via Packet Template (PT). With regard to Packet Template, it is exemplarily referred to document WO 2015/000517 A1.
  Install a "default" permanent (hard timeout=0) low priority detection rule II in switch S1 that discards/drops pong packets when a pong probe packet is received. In general, two rules with same match but different priorities and hard timeouts are installed to help estimating the round-trip time. The low priority detection rule II is matched when the other rule (e.g. the high priority detection rule III) with the same match but with higher priority and a hard timeout≠0 has been removed.
2. On the controller side, set up two variables that represent the current best estimate range R_EST for the round-trip time RTT between switch S1 and switch S2 (lower and upper bounds of R_EST):
  An option to define these bounds is to set the lower bound to zero and the upper bound to a worst case estimate of an upper bound depending on the network in which the measurements are performed. Examples for such upper bounds would for example be 1000 ms for world-wide networks, 200 ms for nation-wide networks in Europe, or 20 ms for data-center networks.
  Another option to determine the bounds is to run a series of tests (again using the timeout test approach) with exponentially increasing timeout values. One can stop the testing if the tests show an above the RTT result. In this case one would use the highest timeout value that is still below the RTT as lower bound and the smallest timeout value above the RTT as upper bound.

3. The SDN controller C sends two instructions to switch S1:
   The SDN controller C sends to switch S1 a high priority detection rule III that matches on pong probe packets. The high priority detection rule III has a timeout (designated as TO in FIG. 2, FIG. 3, FIG. 4 and FIG. 6) of X, where X can be computed by ½*(upper bound+lower bound). Furthermore, the high priority detection rule III include the action to send the received pong probe packet to the SDN controller C:
   i. This means that if the pong probe packet is received within the timeout of X, it is sent to the SDN controller C, whereas
   ii. if the pong probe packet is received after the timeout of X, it is silently discarded by the low priority detection rule II. Therefore, the SDN controller C can identify that the value of the hard timeout that it previously used is above the RTT (if the pong probe packet is received by the SDN controller C) or below the RTT (if the pong probe packet is dropped). Another approach on this conclusion—instead of using the low priority detection rule II to discard/drop pong probe packets that arrive after the timeout expiry of the high priority detection rule III—may be installing a rule that should mark the pong probe packet if received at the switch S1 after the timeout passed, so that the SDN controller C can distinguish between an early (i.e. within the timeout) and a late (i.e. after the timeout) pong probe packet and can use this information along with the selected hard flow timeout to estimate/determine the RTT appropriately. The marking can be provided through e.g. a modification of any unused packet header in the pong probe packet.
   The SDN controller C instructs the switch S1 to send out a ping probe packet from S1 according to rule IV. The ping probe packet is matching the pong probe packet generation rule I in switch S2, which performs in-switch packet generation. To increase the precision of the RTT estimation in the switch S1 the ping generation event (according to rule IV), which is generated by a Packet_out message or which may be created by exploiting the PacketTemplate approach, and the high priority detection rule III activation event should happen synchronously. For example, both events may be transmitted by the SDN controller C within the same flow_mod message which may carry the two events as separate OpenFlow experimental instructions. The instructions are then immediately executed to achieve the event synchronization. Otherwise, both events can be communicated to the switch S1 with separate Open-Flow messages but carrying OpenFlow experimental instructions to trigger the events simultaneously using an internal timer at the switch S1.

4. If a pong probe packet (e.g., packet-in message carrying the pong probe packet due to the high priority detection rule III) is returned to the SDN controller C within an appropriate period as adjustment timeout ATO, then the upper bound for the estimate range will be decreased.

If after an appropriate period no pong probe packet is returned, then the lower bound for the estimate range will be increased. In the example illustrated by FIG. 2, the "appropriate" period ATO is chosen to be longer than the sum of the chosen timeout X from the high priority detection rule III, the estimated round-trip time of the control channel between the controller C and switch S1 (designated as RTT_CC in FIG. 2) and a safety margin A. It is to be noted that if the low priority detection rule II marks the "late" pong probe packet, there is no need to estimate the "appropriate" period ATO of the SDN controller C, rather the reception of any pong probe packet (either late or not) may serve as a trigger for subsequent steps of the operation. Also it is to be noted that ATO estimation does not impact the precision of the RTT estimation, but is solely needed for triggering of subsequent steps of the algorithm.

The embodiment of FIG. 2 leverages a mandatory feature of the OpenFlow Switch specification, namely hard flow timeouts. A hard flow timeout works as follows: When the switch receives a flow_mod message with a hard flow timeout other than 0, the switch will start an internal timer and remove the flow entry after the specified timeout. This timeout functionality in combination with the possibility to generate an immediate response on the target switch, which for instance is feasible by exploiting the Packet Template approach as exemplarily specified in the document WO 2015/000517 A1, allows substituting the need for either:
   In-switch packet time-stamping, which is a functionality usually not available in switches, assuming a switch-based RTT measurement model, or
   Dealing with control-channel RTT estimation inaccuracy, assuming a controller-based RTT measurement model.

Figure 3:
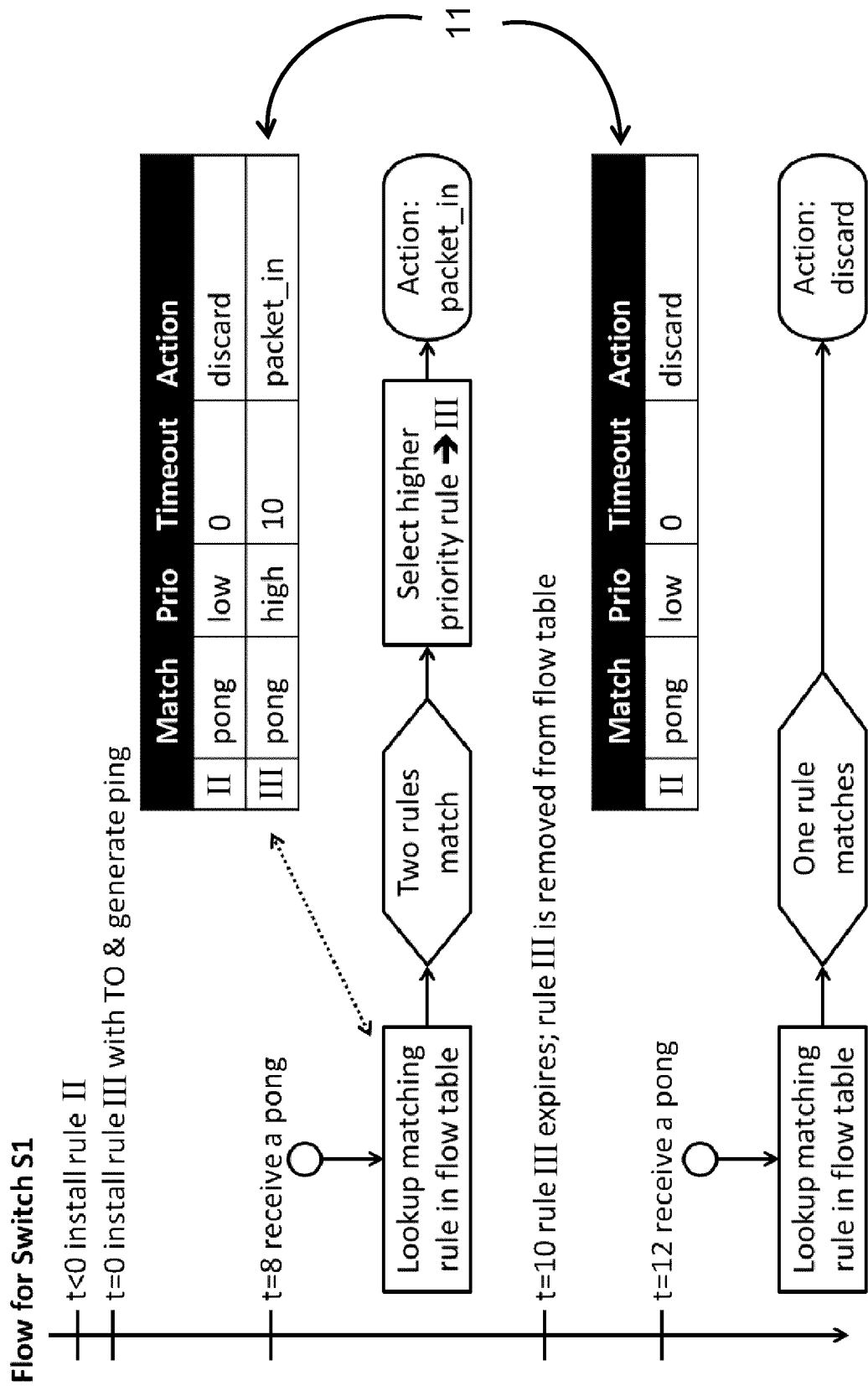
FIG. 3 is a schematic view illustrating an exemplary event timeline for a method according to the embodiment of FIG. 2.

FIG. 3 shows an exemplary event timeline for a method according to the embodiment FIG. 2. According to the example of FIG. 3 the timeout period of the high priority detection rule III is set to 10. At point t=8, switch S1 as source element receives a pong probe packet (designated as "pong" in the figures) from the target element. Switch S1 looks matching rule up in its flow table 11. Since two rules match, namely the low priority detection rule II and the high priority detection rule III, the rule having the higher priority is selected. Due to the action defined by the high priority detection rule III, the pong probe packet is forwarded to the SDN controller. At point t=10 the high priority detection rule III is removed from the flow table 11 of switch S1. Therefore, the pong probe packet that is received at point t=12 by switch S1 is processed by the remaining low priority detection rule II. Thus, the pong probe packet is dropped.

Figure 4:
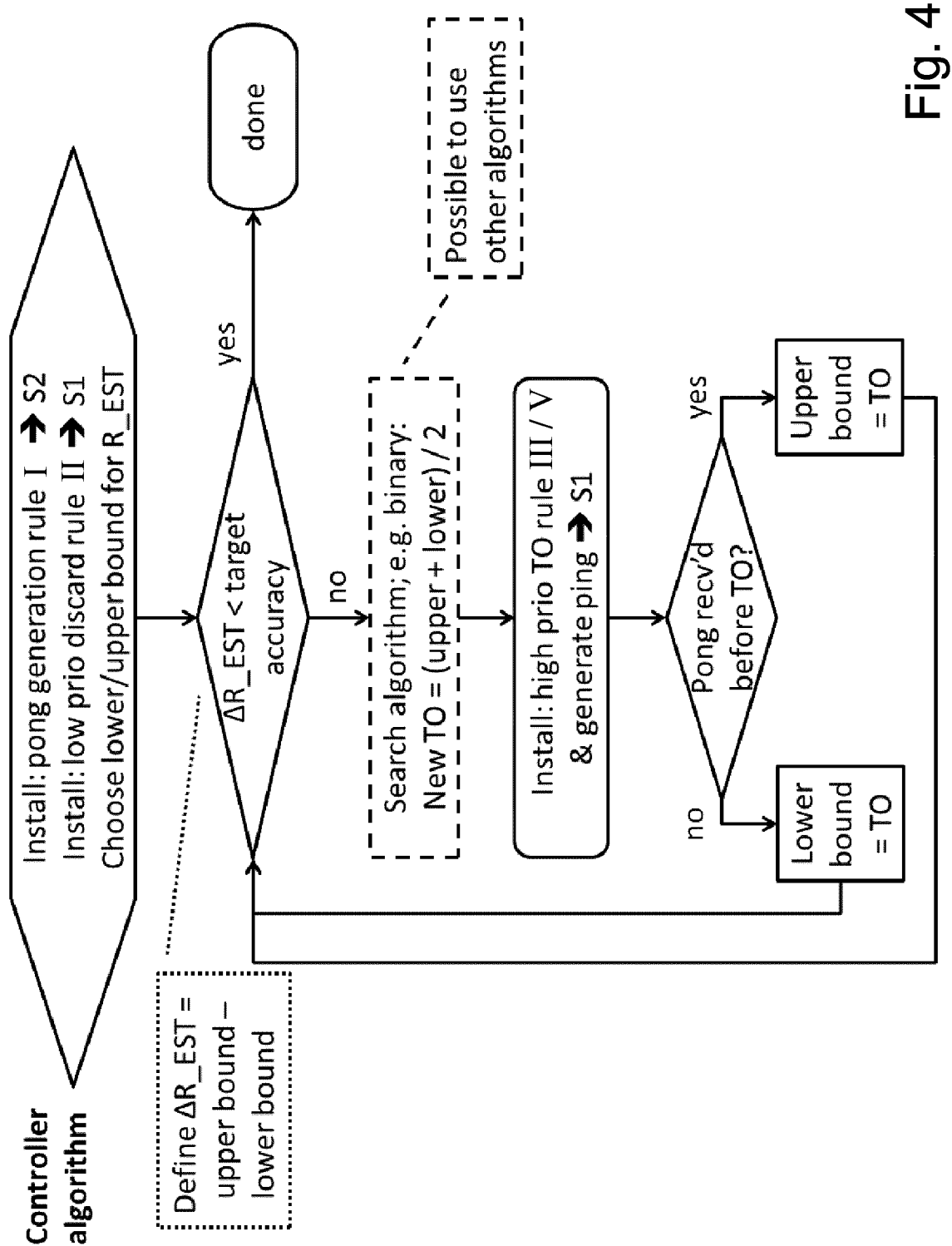
FIG. 4 is a flow chart diagram illustrating a method according to an embodiment of the present invention.

FIG. 4 shows a flow chart diagram illustrating a method according to an embodiment of the present invention. As described above with regard to FIG. 2 and FIG. 3, depending if the pong probe packet returned within the timeout or not, the RTT estimate range is updated according to the controller algorithm illustrated by FIG. 4. If the estimate range is small enough to provide the desired estimation, the execution of the algorithm can stop. If the desired estimation is not achieved, the SDN controller chooses another timeout value NewTO (designated as Y in FIG. 2) based on a suitable search strategy. Moreover, the SDN controller C executes the step of installing the high priority rule (rule V in FIG. 2) and ping generation (rule IV in FIG. 2) again. For example a binary search may be used as search strategy. However, other ones with tractable complexity would also be sufficient. Thus, the controller algorithm illustrated by FIG. 4 is configured to vary the timeouts in order to reduce the RTT estimation range.

In order to increase the speed that this process converges to a good estimation of the RTT, the method according to another embodiment can be extended by running multiple parallel tests. In particular, the controller sends in parallel multiple sets of messages, with each set including of the rules I, II, III and IV. Each set has slightly different match, action and hard timeout fields, so the parallel tests can happen on the data plane without any interference and be successfully identified by the SDN controller C. The SDN controller C chooses different hard flow timeout values for each set of parallel messages; therefore it can faster estimate the RTT. This parallel process requires a small number of flow entries compared to the total number of flow entries in current SDN switches.

FIG. 5 shows a table illustrating flow rules for a more advanced approach on accelerating the estimation of the RTT, wherein the previously mentioned approach of running multiple parallel tests is extended. Here, the priority feature defined in the OpenFlow specification and the capability to encode the different timeouts in an unused field of the packet header is exploited. In the approach of FIG. 5, the rules II and III according to FIG. 2 are replaced with multiple flow rules installed at switch S1 in order to estimate the RTT. All packets are sent to the SDN controller. The rules installed at switch S1 have the same match but different hard timeout and priority values. Using the example of FIG. 5, it is considered that the RTT is greater than two seconds but lower than three seconds. This means that the last two table entries will be removed before the pong reply is received by the switch S1. The pong probe packet will be matched to the remaining three flow rules. The third flow rule will be selected among those matched since it contains the highest priority. The third rule has a timeout value of three seconds. This value is encoded in the packet before it is sent to the SDN controller. Upon the reception of the pong probe packet, the SDN controller identifies that the RTT is lower than three seconds based on the encoded value. Furthermore, it identifies that the RTT is greater than two seconds (i.e., the timeout value of the rule that has been removed last before the pong probe packet's reception—the SDN controller can keep track of all the timeout values used). The embodiment of FIG. 5 eliminates the measurement rounds needed to determine/estimate the RTT and reduces the amount of flow rules needed compared to the approach of using parallel tests. However, the approach illustrated by FIG. 5 requires that all the installed flow rules at switch S1 are concurrently activated.

FIG. 6 shows a table illustrating a numerical example for a method according to an embodiment of the present invention, in particular concerning the embodiment illustrated by FIG. 4. To illustrate the intended working of the embodiment a simple topology is assumed where the two switches S1 and S2 are connected to each other via direct link or a network, both switches are controlled by a SDN controller which also controls the network between the two switches.

Example setting: It is assumed that the RTT between switch S1 and switch S2 is RTT_S1_S2=12 ms, and the RTT between the SDN controller and the switches is RTT_C_S1=18 ms. It is further assumed that the RTTs are composed of equal components of one-way delays (i.e. controller to switch S1 is 9 ms delay). The target accuracy in this example is Acc=2 ms.

Initially the controller does not know the RTT between the switch S1 and the switch S2. According to the above stated controller algorithm according to FIG. 4, it has to choose initial lower and upper bounds for the estimated RTT. For the lower bound it would choose lower bound LB=0 ms, as RTTs cannot be negative. For the upper bound UB it could produce an estimate by sending a packet_out(pong) to switch S1, with only the pong probe packet generation rule installed in switch S2 and no low priority detection rule installed in S1, and measuring the time between sending the packet_out for the ping probe packet and receiving the packet_in for the pong probe packet. In this case this would be at least 30 ms (RTT_C_S1+RTT_S1_S2=18 ms+12 ms), plus potential processing delays in the SDN controller and the switch. Adding a 2 ms processing delay an upper bound of UB=32 ms is got. Now the measurement rounds/iterations are started as illustrated by FIG. 6.

Once the target accuracy is achieved, the execution can be stopped and the estimated RTT between switch S1 and switch S2 can be determined as between 11 ms and 12 ms.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The following is a list of reference numerals used herein:
1 Internet Backbone
2 Point of Presence
3 Backbone Gateways
4 Aggregation Layer
5 Customer Edge
6 Network Management System
7 OSS/BSS
8 Monitoring Probes
9 Monitoring Manager
10 SLA
11 Flow table

The invention claimed is:

1. A method for performing round-trip time determination between a source element and a target element, wherein the source element is a forwarding element of a software defined network, wherein the software defined network comprises one or more forwarding elements and a software defined network controller for controlling the one or more forwarding elements, the method comprising steps of:
- a) instructing the source element to install a low priority detection rule, wherein the low priority detection rule is configured to be triggered by an incoming pong probe packet;
- b) instructing, the source element to install at least one high priority detection rule having a timeout period, wherein the high priority detection rule is configured to be triggered by the incoming pong probe packet;
- c) instructing the source element to send a ping probe packet from the source element to the target element; and
- d) deriving an estimate range for the round-trip time based on the low priority detection rule or the at least one high priority detection rule being triggered by the pong probe packet that is received by the source element from the target element in response to the ping probe packet,
    wherein a measurement iteration comprising steps b), c) and d) is iteratively repeated,
    wherein the timeout period of the high priority detection rule according to step b), which is installed on the source element per measurement iteration, is set to a new timeout period value based on the estimate range derived in a preceding measurement iteration, and
    wherein step d) of a current measurement iteration updates the estimate range for the round-trip time.

2. The method according to claim 1, the method additionally comprising:
    instructing the target element to install a pong probe packet generation rule, wherein the pong probe packet generation rule is configured to be triggered by the incoming ping probe packet.

3. The method according to claim 2, wherein the pong probe packet generation rule is configured to generate the pong probe packet that is sent back to the source element.

4. The method according to claim 1, wherein the low priority detection rule according to step a) is permanently enabled on the source element.

5. The method according to claim 1, wherein the low priority detection rule is configured to drop the incoming pong probe packet.

6. The method according to claim 1, wherein the low priority detection rule is configured:
    to mark the incoming pong probe packet as late, and
    to forward the marked pong probe packet to the software defined network controller.

7. The method according to claim 1, wherein the high priority detection rule is configured to forward the incoming pong probe packet to the software defined network controller.

8. The method according to claim 1, wherein activating the high priority detection rule according to step b) and sending the ping probe packet according to step c) are synchronized.

9. The method according to claim 1, wherein prior to starting a measurement iteration, the estimate range for the round-trip time is initially defined, wherein a lower bound and an upper bound of the estimate range is set up.

10. The method according claim 1, wherein the new timeout period value of a current measurement iteration is computed by (upper+lower)/2, wherein upper is an upper bound of the estimate range derived in the preceding measurement iteration, and wherein lower is a lower bound of the estimate range derived in the preceding measurement iteration.

11. The method according to claim 1, wherein the estimate range is updated by modifying a lower bound or an upper bound of the estimated range depending on whether the pong probe packet, which is responsive to the ping probe packet previously sent out, is received by the source element within the timeout period of the high priority detection rule.

12. The method according to claim 1, wherein a measurement iteration is repeated until a predetermined accuracy of the estimate range for the round-trip time is achieved.

13. The method according to claim 1, wherein the software defined network controller performs measurement tasks in parallel, wherein the measurement tasks comprise steps a)-c), and wherein the timeout period of the high priority detection rules according to step b) of the measurement tasks are set to different timeout period values.

14. The method according to claim 1, wherein multiple high priority detection rules are installed in the source element by step b),
    wherein the multiple high priority detection rules are assigned with different priorities,
    wherein the timeout period of the multiple high priority detection rules are set to different timeout period values, and
    wherein the multiple high priority detection rules are configured to embed information about their timeout period value into the incoming pong probe packet and to forward the pong probe packet to the software defined network controller.

15. A software defined network controller implemented in a software defined network, the software defined network controller being configured to control a source element and a target element in a software defined network, wherein the source element and the target element are forwarding elements that are connected to each other within the software defined network,
    wherein the software defined network controller is configured to instruct the target element to install a pong probe packet generation rule, wherein the pong probe packet generation rule is configured to be triggered by an incoming ping probe packet,
    wherein the software defined network controller is further configured to determine round-trip time between the source element and the target element by:
    - a) instructing the source element to install a low priority detection rule, wherein the low priority detection rule is configured to be triggered by an incoming pong probe packet,
    - b) instructing the source element to install at least one high priority detection rule having a timeout period, wherein the high priority detection rule is configured to be triggered by the incoming pong probe packet,
    - c) instructing the source element to send a ping probe packet from the source element to the target element, and
    - d) deriving an estimate range for the round-trip time based on the low priority detection rule or the at least one high priority detection rule being triggered by the pong probe packet that is received by the source element from the target element in response to the ping probe packet,
    wherein the software defined network controller is further configured to iteratively repeat a measurement iteration comprising steps b), c) and d), wherein the timeout period of the high priority detection rule according to step b), which is installed on the source element per measurement iteration, is configured to be set to a new timeout period value based on the estimate range derived in a preceding measurement iteration, and wherein step d) of a current measurement iteration updates the estimate range for the round-trip time.

* * * * *